March 2, 1943. O. C. SCHERFEL 2,312,490
FLEXIBLE WIRE BELT
Filed Aug. 28, 1940 3 Sheets-Sheet 2

WITNESS
F. J. Hartman.

INVENTOR
Otto Carl Scherfel.
BY John W. Myers
ATTORNEY

March 2, 1943.  O. C. SCHERFEL  2,312,490
FLEXIBLE WIRE BELT
Filed Aug. 28, 1940  3 Sheets-Sheet 3

INVENTOR
Otto Carl Scherfel.
BY John D. Myers
ATTORNEY

WITNESS
F. J. Hartman

Patented Mar. 2, 1943

2,312,490

UNITED STATES PATENT OFFICE 2,312,490

FLEXIBLE WIRE BELT

Otto Carl Scherfel, Philadelphia, Pa., assignor to Audubon Wire Cloth Corporation, a corporation of New Jersey Application August 28, 1940, Serial No. 354,568

7 Claims. (Cl. 198—201)

The invention relates to flexible wire belts and involves an improvement in the construction of the flanges with which such belts are sometimes provided.

The flange structures heretofore utilized with wire belts have usually been of two types. In one type the flange is formed merely by bending the edge of the wire fabric into a position substantially at right angles to the plane of the belt. As may readily be observed from an examination of such a belt, and as has been found in practice, there is not sufficient flexibility in such a flange structure to permit the belt to pass around the usual supporting rollers or drums with the freedom that is usually desirable in a conveyor belt.

Another type of flange structure heretofore employed is made up of a series of overlapping plates which are secured together by pivots or the like and are fastened to the belt in a suitable manner to provide the desired flexibility in the flange as the belt passes around the usual supporting rollers. A flange structure of this character is usually complicated in construction, expensive to manufacture, does not withstand wear to the extent desired, and does not harmonize in appearance with the design of the belt of which it forms a part.

With the above disadvantages of the known structures in view, it is one of the principal objects of the present improvement to provide a woven wire belt or conveyor with a flange structure which is sufficiently flexible to permit the belt to pass around the usual rollers or drums readily and easily. Another object of the improvement is the provision of a flange structure which is sufficiently flexible to permit the belt to which the flange is secured to pass around the usual rollers or drums without subjecting the flange to unusual strain or wear. A further object of the improvement is the provision of a flange structure which may be easily made, and may be readily formed as a part of or attached to a woven wire belt. Another object of the improvement is the provision of a flange which is of durable character and is not readily subject to wear when the belt is in use. A still further object of the invention is the provision of a flange structure which is designed to harmonize with the design of the conveying surface of the belt and not detract from the appearance of the entire belt structure. Other objects and advantages of the improvement will be apparent from the following description, taken with the accompanying drawings wherein:

Figure 1:
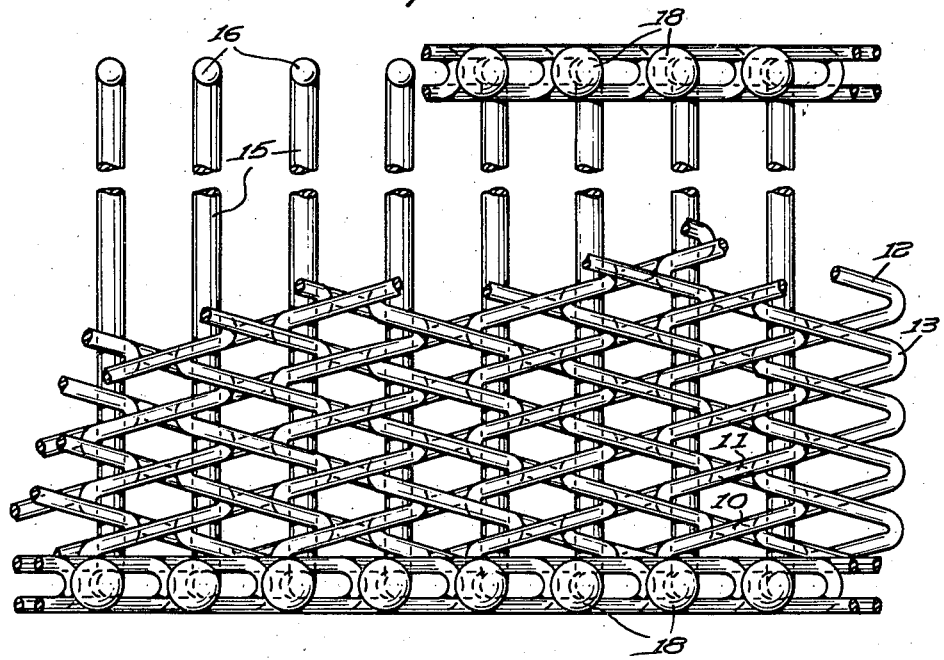
Fig. 1 is a plane view of a portion of a woven wire belt, with my improved flange structure incorporated in the opposite edges thereof.
Figure 2:
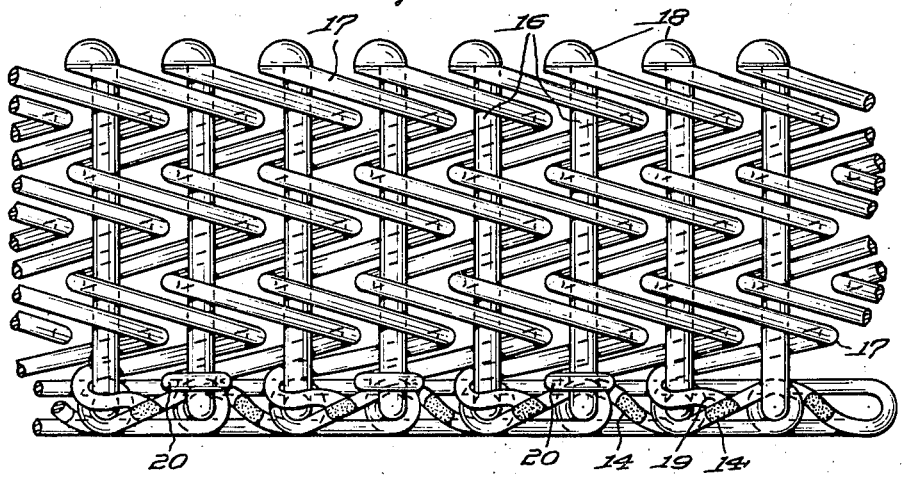
Fig. 2 is a side elevational view of a portion of the flange structure illustrated in Fig. 1.
Figure 3:
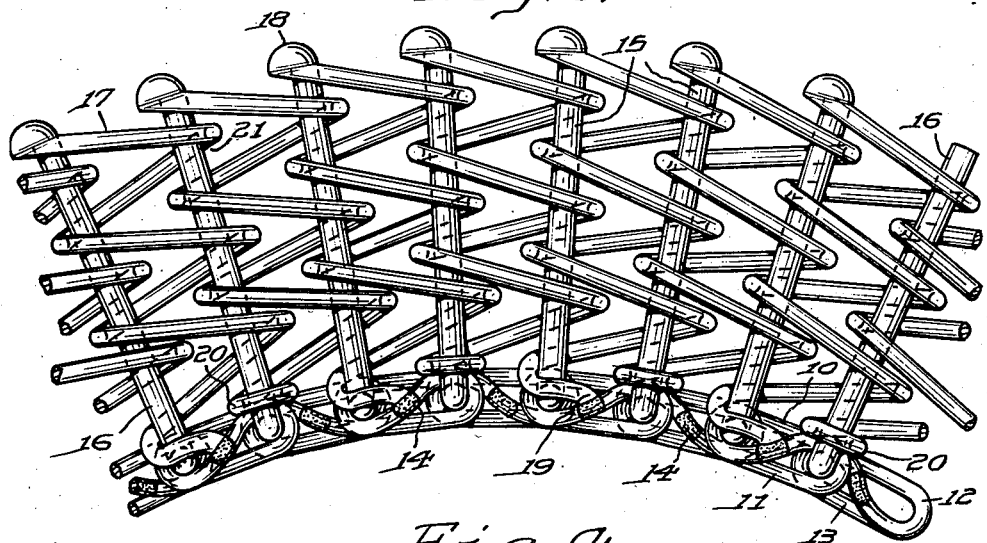
Fig. 3 is a view similar to Fig. 2, but showing the relation of the flange elements when the belt is flexed.

As illustrated in Figs. 1, 2 and 3 of the drawings, my improved flange is incorporated in a wire belt having a bottom or conveying portion made up of successive composite coils. Each composite coil is formed of two spiral coils of the same twist and threaded together. For purposes which are well understood in the art, each composite coil is joined to a composite coil of opposite twist. In the present case, alternate composite coils are made up of two coils 10 and 11 of right-hand twist, and these right hand composite coils alternate with composite coils made up of two coils 12 and 13 of left-hand twist. As illustrated in Figs. 2 and 3 of the drawings, the ends of the two spirals forming each of the composite coils are welded together at the edges of the belt, as shown at 14, to provide a rigid coil structure.

In this form of belt, successive composite coils are secured together by slightly overlapping the turns of one coil with the turns of an adjacent coil and passing a hinge rod 15 through the overlapping portions. The opposite ends of the hinge rods 15 are bent into a position substantially perpendicular to the plane of the belt in order to provide flange supporting posts 16. As will be apparent from the showing in Fig. 1, the supporting posts 16 are arranged in a straight line along the edge of the bottom or conveying portion of the belt to thus define the position of the flange.

As may be seen from Figs. 2 and 3 of the drawings, the flange supporting posts 16 are enclosed by a series of flange coils 17 of helical form, the turns of each coil being nested within the turns of adjacent coils. In the construction illustrated, one of the helical coils 17 enclosing each post 16 has its upper end welded or otherwise rigidly secured to the upper end of the post as shown at 18. The coil thus rigidly secured to the upper end of a post 16 encloses an adjacent post 16 and may have its lower end secured to a weld 14, as indicated at 19, or its lower end may be merely knuckled around the lower end of the supporting post to which its upper end is secured, as shown at 20.

As will be apparent from the showing in Fig. 2, the length of the turns of the flange coils 17 is such that each coil overlaps its two adjacent coils to such extent as to provide a lost motion connection between each post and one of its enclosing coils and to provide the desired flexibility of the belt when it passes around the usual supporting drums or rollers. The relative position of the flange coils 17 and the flange posts 16 when the belt is flexed on the side opposite the posts is shown in Fig. 3 of the drawings. As will be apparent therefrom, the belt may be flexed, without producing any unusual strain upon the flange structure, until the outer ends of the flange posts 16 are moved into a position where they are in engagement with the end of the outer turn of the coil in which they are freely movable, as illustrated at 21. In order to provide this flexibility or freedom of movement, it will be apparent that the length of the turns of the flange coils 17 should be substantially greater than the length of the turns of the coils 10, 11 and 12, 13, which make up the bottom or conveying portion of the belt, and the turns of successive coils are nested rather than interlocked with each other.

The structure of the flange shown in Figs. 1, 2 and 3 is one in which the lower ends of the flange coils 17 are alternately welded to the adjacent composite coil in the bottom of the belt and knuckled around a supporting post. It will be understood, however, that the lower ends of all the flange coils 17 may be welded in the manner illustrated at 19, or all may be knuckled about the posts, as shown at 20, if desired.

Figure 4:
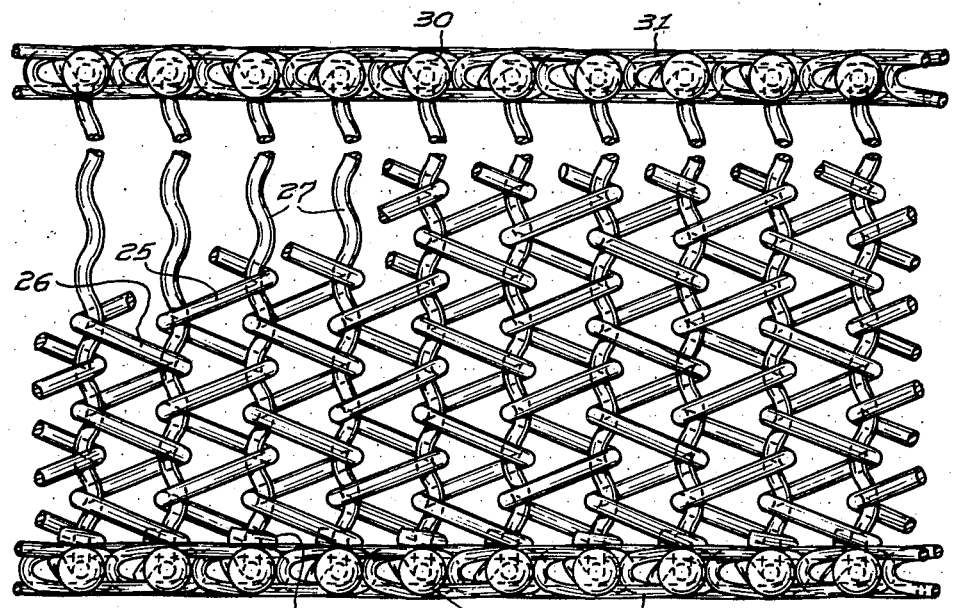
Fig. 4 is a plan view illustrating the utilization of my improved flange with another form of woven wire belt.
Figure 5:
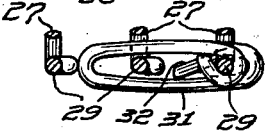
Fig. 5 is a detailed sectional view of a portion of the flange structure illustrated in Fig. 4.
Figure 6:
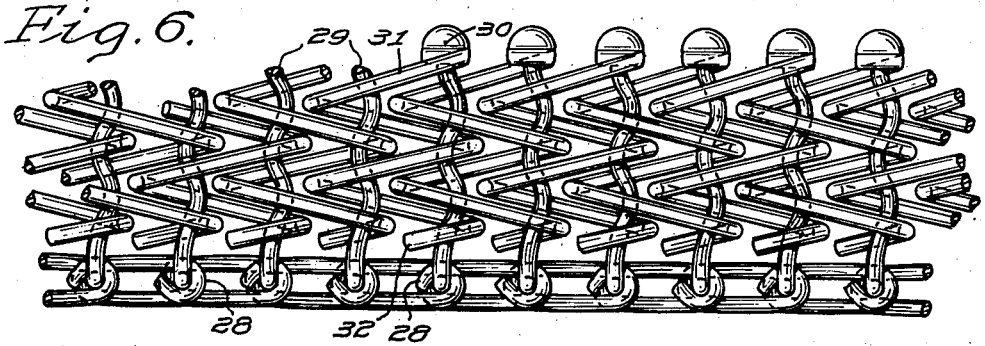
Fig. 6 is a side elevational view of a portion of the flange employed with the belt shown in Fig. 4.

The wire belt illustrated in Figs. 4, 5 and 6 of the drawings is formed from a succession of right-hand coils 25 and left-hand coils 26 arranged alternately, with the turns in overlapping relation, and secured together by means of crimped hinge rods 27 passing through the overlapping portions of the turns of adjacent coils. The ends of each coil are preferably bent or knuckled around the hinge rods 27 along the opposite edges of the belt, as shown at 28. The opposite ends of the hinge rods 27 are bent at right angles to the plane of the belt to form aligned flange supporting posts 29. In this form of belt the crimped formation of the hinge rods 27 tends to position each bottom coil with respect to its adjacent bottom coils, although the crimping may be omitted from the up-turned portions which form the flange posts 29.

As in the form of belt described above, the upwardly turned ends of the hinge rods 27 constitute flange-defining posts. Each post 29 has welded or otherwise rigidly secured to its upper end, as shown at 30, a flange coil 31 which encloses the post to which it is secured as well as an adjacent post 29, its lower end being knuckled at 32 about the same post to which the upper end of the coil is secured. In this form of the invention, the flange coils 31 are alternately of right and left hand twist. As in the form heretofore described, the turns of each flange coil are nested within the turns of adjacent coils and overlap the turns of adjacent coils to such extent as to permit the outer ends of the posts 29 to move freely toward and away from each other as the belt is flexed in passing around the usual drums or rollers. In order to permit this freedom of movement, the length of the turns of the flange coils is substantially greater than the length of the turns of the bottom coils 25, 26. The extent of movement of the outer ends of the posts is limited by the extent of the overlapping of the turns of adjacent coils.

Figure 7:
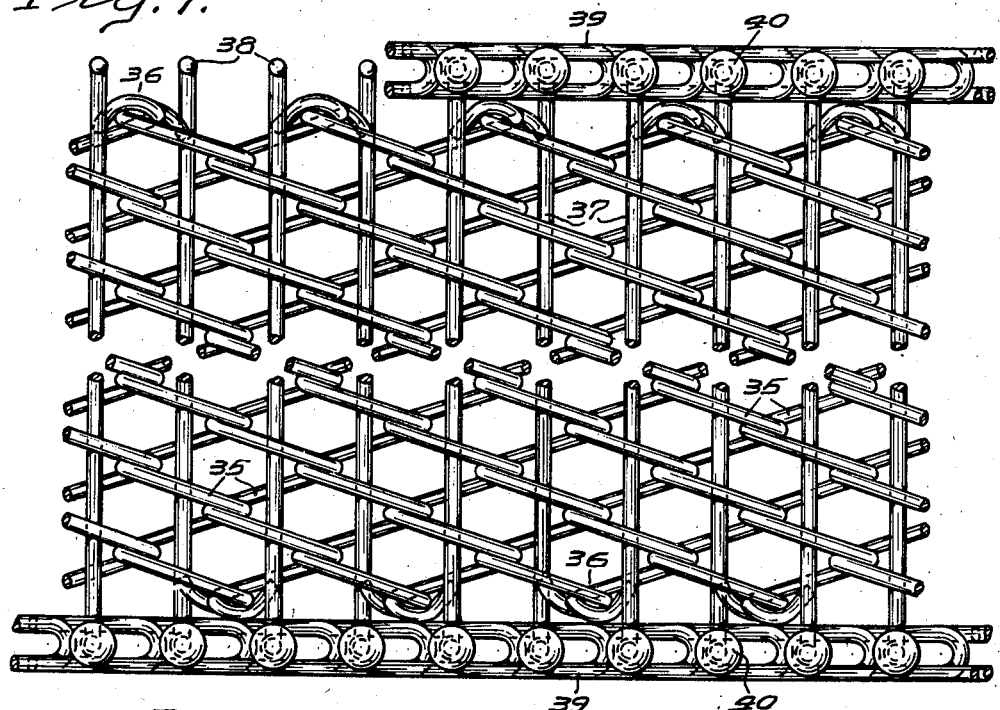
Fig. 7 is a plan view, partly broken away, illustrating the manner in which my improved flange may be incorporated in another type of woven wire belt.
Figure 8:
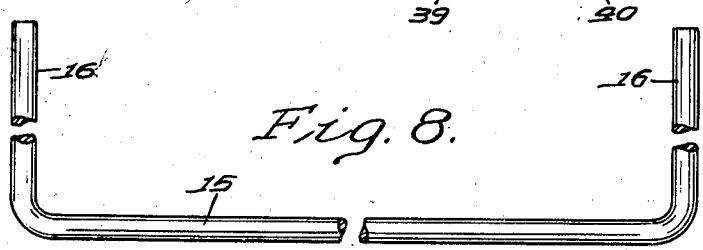
Fig. 8 is a side elevational view, partly broken away, illustrating one of the cross rods and the manner in which the flange supporting posts may be formed on the ends thereof.

In the form of belt illustrated in Fig. 7 of the drawings, the bottom or conveyor portion is made up of a series of interwoven coils 35 wound in the same direction, and the ends of successive pairs of coils 35 are knuckled together in the manner illustrated at 36. In this case, the cross rods 37 extend freely through successive coils without forming a part of the hinging structure. The cross rods 37 may be freely movable with respect to the coils 35 or they may be welded or otherwise secured thereto if desired.

With this form of belt, the opposite ends of the cross rods 37 are turned upwardly substantially at right angles to the plane of the bottom portion of the belt to form flange posts 38. The flange structure illustrated therewith is similar to that utilized with the form of the invention shown in Figs. 1, 2 and 3, that is, the flange coils 39 are of the same twist and each has its upper end welded to the top of a flange post 38, as shown at 40. The lower end of each flange coil 39 may be knuckled around the lower end of the post to which its upper end is secured, in the manner illustrated at 20 in Figs. 2 and 3.

In the various forms of the improvement disclosed, the cross rods extend throughout the width of the belt and the flanges are positioned along the edges of the belt. It will be apparent, however, that other cross rod constructions may be utilized, and that the improved flange may be located otherwise than along an edge of the belt. In other respects, it is to be understood that the invention is not intended to be limited to the precise structure and arrangement of parts as shown and described. The disclosure is therefore to be regarded as illustrative only, and it is to be understood that the invention is susceptible of embodiment in other forms and arrangements so long as they are within the scope of the claims hereby made.

What I desire to claim is:

1. A woven wire belt comprising a plurality of bottom coils extending transversely of the belt and successively connected together to form a flexible structure, cross rods extending through said bottom coils and having the ends thereof at each edge of the belt projecting in a plane at an angle with respect to the plane of the belt to form flange defining posts, and flange forming coils secured to each of said posts and movably engaging an adjacent post, the turns of said flange forming coils being of greater length than the turns of said bottom coils to permit limited turning movement of each of said rods with respect to adjacent rods.

2. A woven wire belt comprising a plurality of bottom coils extending transversely of the belt and successively connected together to form a flexible structure, cross rods extending through said bottom coils and having the ends thereof at each edge of the belt projecting in a plane at an angle with respect to the plane of the belt to form flange supporting posts, and flange forming coils secured to each of said posts and enclosing an adjacent post, the turns of said flange forming coils being of greater length than the turns of said bottom coils whereby said belt may be flexed freely about an axis on the side of said belt opposite said posts.

3. A woven wire belt comprising a plurality of bottom coils extending transversely of the belt and successively connected together to form a flexible structure, cross rods extending through said bottom coils and having the ends thereof at each edge of the belt projecting in a plane at an angle with respect to the plane of the belt to form flange defining posts, and a flange coil secured to each of said posts and freely enclosing an adjacent post, the length of the turns of said flange coils being substantially greater than the length of the turns of said bottom coils to permit the belt to flex freely on one side of the plane of the belt.

4. A woven wire belt comprising a plurality of bottom coils extending transversely of the belt and successively connected together to form a flexible structure, cross rods extending through said bottom coils and having the ends thereof at each edge of the belt projecting in a plane at an angle with respect to the plane of the belt to form flange supporting posts, and a flange coil enclosing each successive pair of said posts and having one end thereof secured to one post of each pair, the length of the turns of said flange coils being substantially greater than the length of the turns of said bottom coils to permit said belt to flex freely on the side of the belt opposite said posts.

5. A woven wire belt comprising a plurality of bottom coils extending transversely of the belt and successively connected together to form a flexible structure, cross rods extending through said bottom coils and having the ends thereof at each edge of the belt projecting in a plane at an angle with respect to the plane of the belt to form flange supporting posts, and a flange coil enclosing successive pairs of said posts and having both ends thereof secured to one post of each pair, the length of the turns of said flange coils being substantially greater than the length of the turns of said bottom coils to permit said belt to flex freely on the side of the belt opposite said posts.

6. In a woven wire belt comprising a plurality of helical bottom coils extending in parallel relation transversely of the belt and having the turns of successive coils overlapping each other and hinge rods extending through the overlapping portions of said bottom coils, the combination therewith of edge flanges comprising a plurality of helical side coils extending at an angle with respect to said bottom coils and having the turns of successive coils in overlapping relation, the turns of said side coils being of substantially greater length than the turns of said bottom coils, angular extensions on the ends of said hinge rods and projecting through the overlapping portions of the turns of successive side coils, and means for securing each of said side coils to one of the extensions projecting therethrough, the other extension being freely movable therein.

7. A woven wire belt comprising a plurality of parallel bottom coils extending transversely of the belt and connected together in succession to provide a conveying surface, a flexible flange on said belt and comprising a plurality of helical coils arranged in succession with the turns of each overlapping the turns of adjacent coils to provide overlapping coil portions, flange supporting posts mounted on said belt at an angle to said conveying surface and extending through said overlapping coil portions and being fixed to one of said portions and movable with respect to the other, the length of the turns of the coils in said flange being substantially greater than the length of the turns of said bottom coils.

OTTO CARL SCHERFEL.